US012694059B2

(12) United States Patent
Nishimura et al.

(10) Patent No.: US 12,694,059 B2
(45) Date of Patent: Jul. 28, 2026

(54) INFORMATION PROCESSING DEVICE, INFORMATION PROCESSING METHOD, AND INFORMATION PROCESSING PROGRAM

(71) Applicant: OMRON CORPORATION, Kyoto (JP)

(72) Inventors: Taichi Nishimura, Kyoto (JP); Shinsuke Mori, Kyoto (JP); Atsushi Hashimoto, Tokyo (JP); Yoshitaka Ushiku, Tokyo (JP)

(73) Assignee: OMRON Corporation, Kyoto (JP)

( * ) Notice: Subject to any disclaimer, the term of this patent is extended or adjusted under 35 U.S.C. 154(b) by 125 days.

(21) Appl. No.: 18/840,896

(22) PCT Filed: Feb. 10, 2023

(86) PCT No.: PCT/JP2023/004652
§ 371 (c)(1),
(2) Date: Aug. 22, 2024

(87) PCT Pub. No.: WO2023/166958
PCT Pub. Date: Sep. 7, 2023

(65) Prior Publication Data
US 2025/0173929 A1 May 29, 2025

(30) Foreign Application Priority Data
Mar. 2, 2022 (JP) ................................. 2022-032177

(51) Int. Cl.
*G06T 11/60* (2026.01)
*G06F 16/783* (2019.01)
*G06V 10/22* (2022.01)

(52) U.S. Cl.
CPC .......... *G06T 11/60* (2013.01); *G06F 16/7837* (2019.01); *G06V 10/22* (2022.01)

(58) Field of Classification Search
CPC ..... G06T 11/60; G06F 16/7837; G06V 10/22; G06V 10/82; G06V 20/44; G06V 20/47
See application file for complete search history.

(56) References Cited

U.S. PATENT DOCUMENTS

2017/0127016 A1* 5/2017 Yu ........................... G06N 3/084
2018/0005087 A1* 1/2018 Ono ......................... G06N 7/01
(Continued)

FOREIGN PATENT DOCUMENTS

JP 2018-170003 A 11/2018
JP 2019-046304 A 3/2019
JP 2019-537147 A 12/2019

OTHER PUBLICATIONS

Zhao, Yue, "Temporal Action Detection With Structured Segment Networks", 2017, Proceedings of the IEEE International Conference on Computer Vision (ICCV), pp. 2914-2923 (Year: 2017).*
(Continued)

*Primary Examiner* — Terrell M Robinson
(74) *Attorney, Agent, or Firm* — Morgan, Lewis & Bockius LLP

(57) ABSTRACT
The present disclosure provides an information processing device including an acquisition unit that acquires a video image, a partitioning unit that partitions the video image into plural event video images as candidates for appending a caption, an event selection unit that selects the event video image from the candidates by using a selection model for selecting the event video image from plural event video images such that a range of an event is neither too broad nor too narrow, with the selection model using a differentiable function, and a generation unit that generates a video image appended with captions by employing an appending model for appending a caption to an event represented by the input event video image to append a caption to the selected event video image.

20 Claims, 6 Drawing Sheets

(56)                 References Cited

U.S. PATENT DOCUMENTS

| | | | |
|---|---|---|---|
| 2018/0143966 A1 | 5/2018 | Lu et al. | |
| 2018/0144208 A1 | 5/2018 | Lu et al. | |
| 2018/0144248 A1 | 5/2018 | Lu et al. | |
| 2018/0225519 A1 | 8/2018 | Chen et al. | |
| 2020/0057805 A1 | 2/2020 | Lu et al. | |
| 2020/0074180 A1* | 3/2020 | Takegawa | G06N 3/09 |
| 2020/0117710 A1* | 4/2020 | Okura | G06N 3/0499 |
| 2020/0117854 A1 | 4/2020 | Lu et al. | |
| 2021/0272599 A1* | 9/2021 | Patterson | G06N 3/091 |
| 2022/0092264 A1* | 3/2022 | Takahashi | G06N 3/088 |

OTHER PUBLICATIONS

Xiong, Yilei, "Move Forward and Tell: A Progressive Generator of Video Descriptions", 2018, Proceedings of the European Conference on Computer Vision (ECCV), pp. 1-16 (Year: 2018).*

Xiong et al., "Move Forward and Tell: A Progressive Generator of Video Descriptions," Computer Vision—ECCV 2018 Part XI, Oct. 10, 2018, pp. 489-505, [retrieved on Apr. 4, 2023] Retrieved from the Internet: <URL: https://link.springer.com/chapter/10.1007/978-3-030-01252-6_29>.

Zhao et al., "Temporal Action Detection with Structured Segment Networks," 2017 IEEE International Conference on Computer Vision (ICCV), Oct. 22, 2017, pp. 2933-2942.

Ju et al., "Divide and Conquer for Single-frame Temporal Action Localization," 2021 IEEE/CVF International Conference on Computer Vision (ICCV), Oct. 10, 2021, pp. 13435-13444.

Piergiovanni et al., "Learning Latent Super-Events to Detect Multiple Activities in Videos," 2018 IEEE/CVF Conference on Computer Vision and Pattern Recognition, Jun. 18, 2018, pp. 5304-5313.

Li et al., "A joint model for action localization and classification in untrimmed video with visual attention," 2017 IEEE International Conference on Multimedia and Expo (ICME), Jul. 10, 2017, pp. 619-624.

International Search Report and Written Opinion dated Apr. 18, 2023, for corresponding International Patent Application No. PCT/JP2023/004652.

Lei et al., "MART: Memory-Augmented Recurrent Transformer for Coherent Video Paragraph Captioning", arxiv.org, Cornell University Library, 15 pages, May 11, 2020.

Mun et al., "Streamlined Dense Video Captioning", arxiv.org, Cornell University Library, April 8, 2019, 10 pages.

Nishimura et al., "Recipe Generation from Unsegmented Cooking Videos", Journal of Latex Class Files, vol. 14, No. 8, Aug. 2015, pp. 1-11.

Extended European Search Report issued in corresponding European Patent Application No. 23763220.3, dated Oct. 23, 2025.

* cited by examiner

10

21   ACQUISITION UNIT

22   PARTITIONING UNIT

23   EVENT SELECTION UNIT

24   GENERATION UNIT

25   OUTPUT UNIT

26   STORAGE UNIT

27   UPDATE UNIT

28   TRAINING UNIT

FIG.4

INFORMATION PROCESSING DEVICE, INFORMATION PROCESSING METHOD, AND INFORMATION PROCESSING PROGRAM

The present invention relates to an information processing device, an information processing method, and a computer-readable storage medium storing an information processing program.

TECHNICAL FIELD

The present invention relates to an information processing device, an information processing method, and an information processing program.

BACKGROUND ART

In recent years, there is technology in the field of machine learning for detecting events, such as an object, an operation, or a condition, in images and video images, and appending a caption (explanatory text) to the events.

For example, in a system disclosed in Japanese National-Phase Publication No. 2019-537147 (Patent Document 1), features are extracted from images, and captions are appended to events by using the features to decide words.

Moreover, in "Move forward and tell: a progressive generator of video descriptions" by Xiong, Y., Dai, B., Lin, D. in: Proc. ECCV. pp. 489-505 (2018)<URL: https://www.ecva.net/papers/eccv_2018/papers_ECCV/papers/Yilei_Xiong_Move_Forward_and_ECCV_2018_paper.pdf> (Non-Patent Document 1), a system is disclosed in which a video image is partitioned into various ranges according to events contained in the video image, partitioned video images are selected such that the event ranges do not overlap, and captions are appended to events represented in the selected video images.

However, in the technology described in above Patent Document 1, a vast amount of compute is needed to append the explanatory text to the video images, and so captions are not necessarily able to be appended to video images.

Moreover, in the technology described in Non-Patent Document 1, trained models of a model to extract events such that overlap does not occur, and a model to append a caption to an extracted event, are respectively employed to append captions. Namely, due to the training to extract events and the training to append captions being performed individually, sometimes accuracy of captions for the extracted events is not uniform.

SUMMARY OF INVENTION

Technical Problem

An object of the present invention is to provide an information processing device, an information processing method, and a computer-readable storage medium storing an information processing program that are able to append captions with high accuracy when appending captions to events using a model to extract events and a model to append captions to the extracted events.

Solution to Problem

An information processing device of a first aspect of the present disclosure includes an acquisition unit that acquires a video image, a partitioning unit that partitions the acquired video image into plural event video images as candidates for appending a caption by partitioning according to events, an event selection unit that selects the event video image from the partitioned event video image candidates by using a selection model for selecting the event video image from plural input event video images such that a range of an event is neither too broad nor too narrow, with the selection model selecting the event video image using a differentiable function, and a generation unit that generates a video image set with captions by employing an appending model for appending a caption to an event represented by the input event video image to append a caption to the selected event video image.

An information processing device of a second aspect is the information processing device according to the first aspect, wherein the differentiable function includes a Gumbel-Softmax function.

The information processing device of a third aspect is the information processing device according to the first aspect or the second aspect, further including a storage unit that stores a feature of an event video image selected in the past from the candidates in a first memory vector, wherein when selecting the event video image the event selection unit employs the first memory vector to select an event video image indicating a continuation of an event video image selected in the past.

An information processing device of a fourth aspect is the information processing device according to the third aspect, wherein the storage unit stores a feature value of the caption appended to the event video image in a second memory vector, and the generation unit employs the second memory vector to select a word indicating a continuation of an appended caption, and adds the selected word to a caption appended in the past, and appends this to the event video image.

An information processing device according to a fifth aspect is the information processing device according to the fourth aspect, further including an update unit that updates the first memory vector stored in the storage unit, wherein the update unit updates the first memory vector using the second memory vector, and the event selection unit uses the updated first memory vector to select a next of the event video images from the candidates.

An information processing device according to a sixth aspect is the information processing device according to the fourth aspect or the fifth aspect, further including an update unit that updates the second memory vector stored in the storage unit, wherein the update unit updates the second memory vector using the first memory vector, and the generation unit selects a next word for the selected event video image using the updated second memory vector.

An information processing device according to a seventh aspect is the information processing device of any one of the first aspect to the sixth aspect, further including a training unit that trains by propagating a training result learnt by the appending model to the selection model, or that individually trains each of the selection model and the appending model.

An information processing device according to an eighth aspect is the information processing device of the seventh aspect, wherein the partitioning unit includes a partitioning model that has been trained to partition the event video image from the video image, and the training unit trains by propagating a training result learnt by the selection model to the partitioning model.

An information processing method according to a ninth aspect acquires a video image, partitions the acquired video image into plural event video images as candidates for appending a caption by partitioning according to events, selects the event video image from the partitioned event video image candidates by using a selection model for selecting the event video image from plural input event video images such that a range of an event is neither too broad nor too narrow, with the selection model selecting the event video image using a differentiable function, and generates a video image set with captions by employing an appending model for appending a caption to an event represented by the input event video image to append a caption to the selected event video image.

A non-transitory computer-readable storage medium storing an information processing program according to a tenth aspect, the information processing program causing a computer to execute processing. The processing includes acquiring a video image, partitioning the acquired video image into plural event video images as candidates for appending a caption by partitioning according to events, selecting the event video image from the partitioned event video image candidates by using a selection model for selecting the event video image from plural input event video images such that a range of an event is neither too broad nor too narrow, with the selection model selecting the event video image using a differentiable function, and generating a video image set with captions by employing an appending model for appending a caption to an event represented by the input event video image to append a caption to the selected event video image.

Advantageous Effects of Invention

The present disclosure enables captions to be appended with high accuracy when appending captions to events using a model to extract events and a model to append captions to the extracted events.

BRIEF DESCRIPTION OF DRAWINGS

FIG. 4 is a schematic diagram illustrating an example of video image data and candidate data according to the present exemplary embodiment.

DESCRIPTION OF EMBODIMENTS

Figure 1:
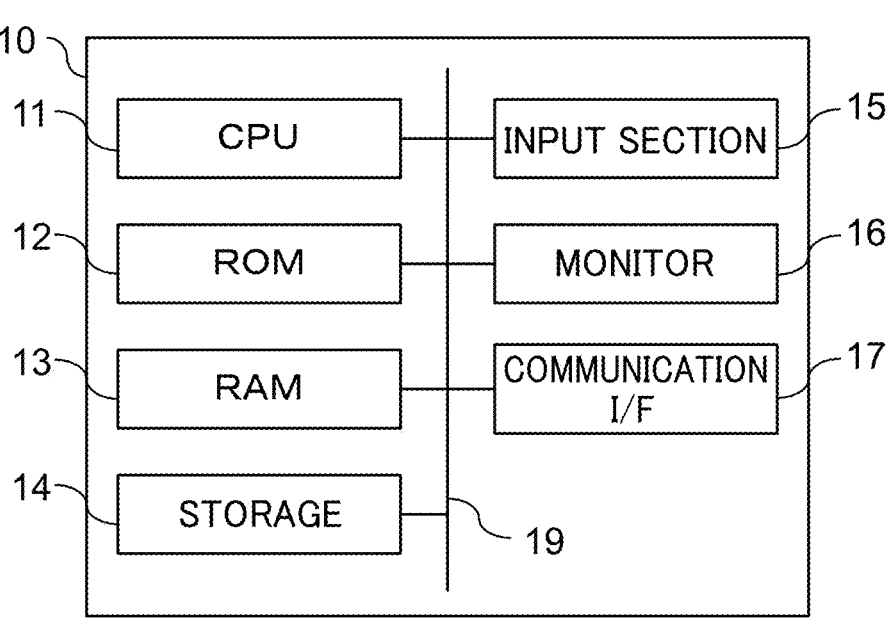
FIG. 1 is a block diagram illustrating an example of a hardware configuration of an information processing device according to the present exemplary embodiment.

Explanation follows regarding an example of an exemplary embodiment of the present disclosure, with reference to the drawings. Note that the same reference numerals will be appended in the drawings to the same or equivalent configuration elements and parts. Moreover, dimensions and proportions in the drawings are exaggerated for ease of explanation, and sometimes differ from actual proportions.

FIG. 1 is a block diagram illustrating an example of a hardware configuration of an information processing device 10. As illustrated in FIG. 1, the information processing device 10 according to the present exemplary embodiment is configured including a central processing unit (CPU) 11, read only memory (ROM) 12, random access memory (RAM) 13, storage 14, an input section 15, a monitor 16, and a communication interface (communication I/F) 17. The CPU 11, the ROM 12, the RAM 13, the storage 14, the input section 15, the monitor 16, and the communication I/F 17 are connected together through a bus 19.

The CPU 11 performs integrated control of the information processing device 10 overall. The ROM 12 is stored with various programs, including an information processing program, data, and the like employed in the present exemplary embodiment. The RAM 13 is memory employed as a work area during execution of the various programs. The CPU 11 performs training processing and generation processing by expanding and executing the program stored on the ROM 12 in the RAM 13.

The storage 14 is, as an example, a hard disk drive (HDD), solid state drive (SSD), flash memory, or the like. The input section 15 is a mouse, touch panel, keyboard, or the like that receives input of text, selections of subjects, and the like. The monitor 16 displays text and images. The communication I/F 17 performs transmission and reception of data.

Figure 2:
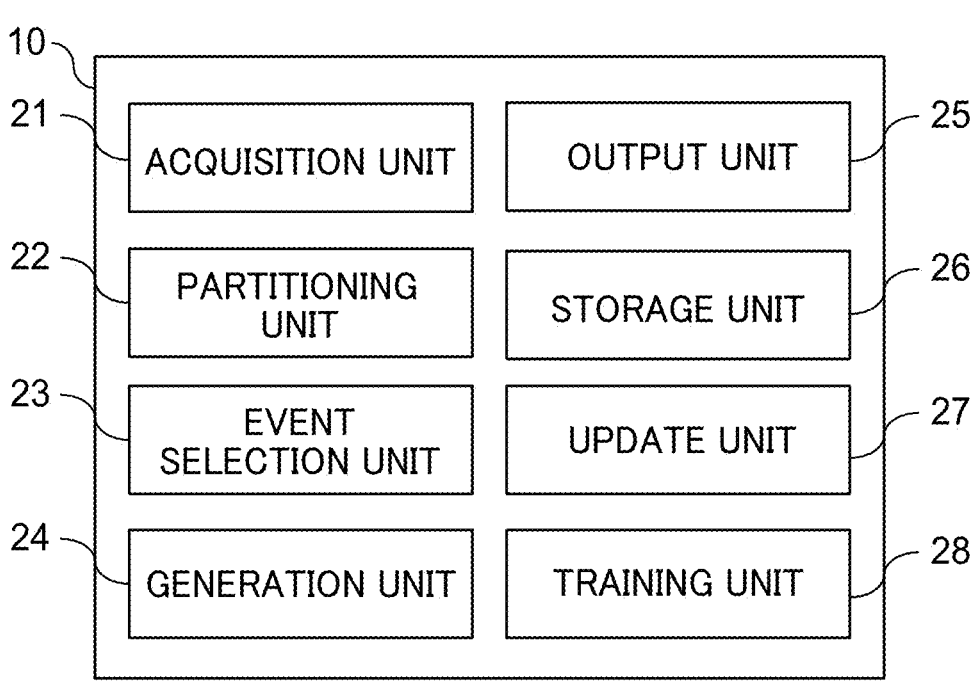
FIG. 2 is a block diagram illustrating an example of a functional configuration of an information processing device according to the present exemplary embodiment.
Figure 3:
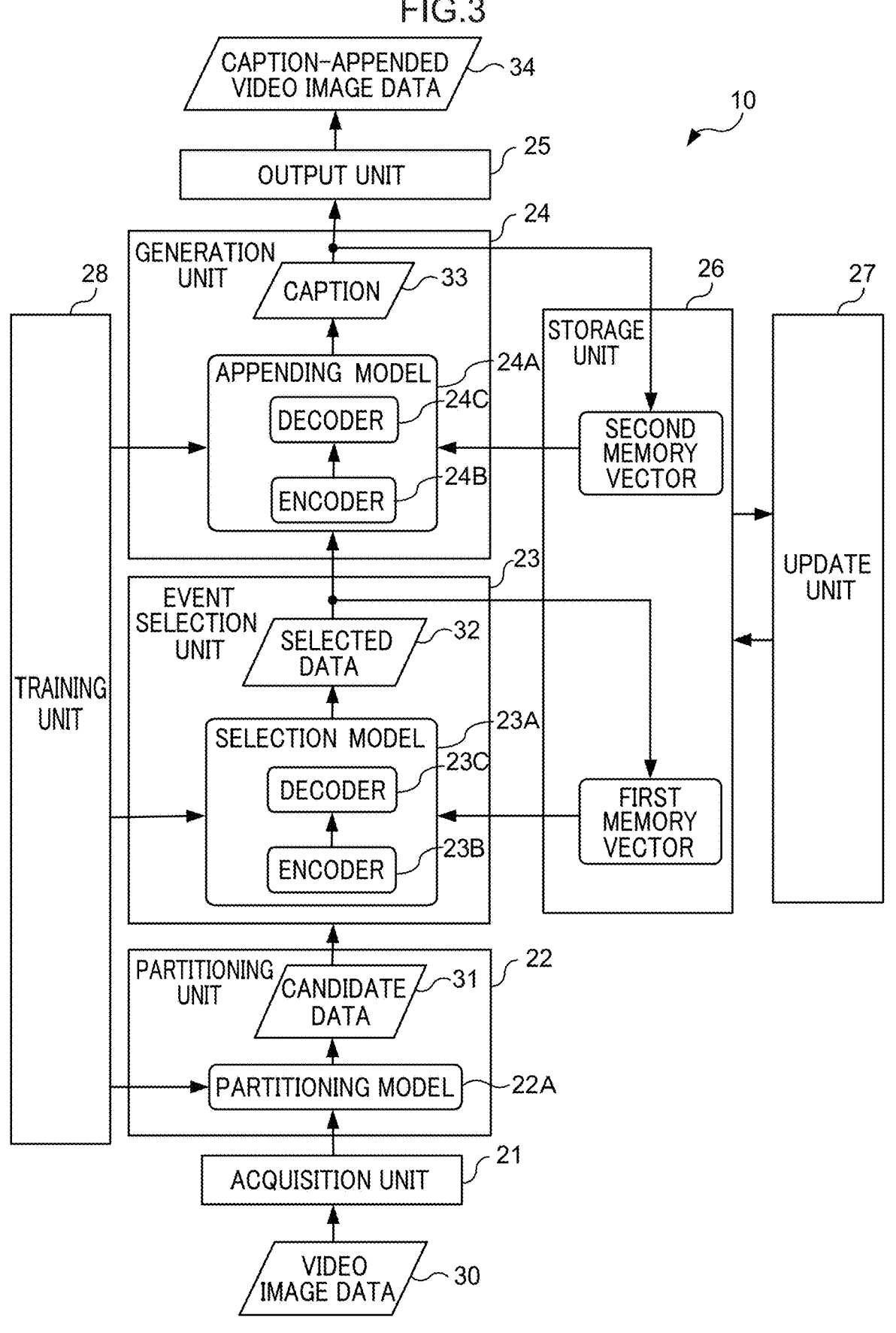
FIG. 3 is a data flowchart illustrating an example of a flow of data to accompany explanation of a functional configuration of an information processing device according to the present exemplary embodiment.

Next, description follows regarding a functional configuration of the information processing device 10, with reference to FIG. 2 and FIG. 3. FIG. 2 is a block diagram illustrating an example of a functional configuration of the information processing device 10 according to the present exemplary embodiment. FIG. 3 is a data flowchart illustrating an example of a flow of data to accompany explanation of the functional configuration of the information processing device 10 according to the present exemplary embodiment.

As illustrated as an example in FIG. 2, the information processing device 10 includes an acquisition unit 21, a partitioning unit 22, an event selection unit 23, a generation unit 24, an output unit 25, a storage unit 26, an update unit 27, and training unit 28. The CPU 11 functions as the acquisition unit 21, the partitioning unit 22, the event selection unit 23, the generation unit 24, the output unit 25, the storage unit 26, the update unit 27, and the training unit 28 by executing the information processing program.

As illustrated as an example in FIG. 3, the acquisition unit 21 acquires input video image data 30.

The partitioning unit 22 extracts events from the acquired video image data 30, and partitions into video image data containing these events (hereafter referred to as "event video images". The partitioning unit 22 partitions into plural event video image data (hereafter referred to as "candidate data") 31 as candidates for event video images for appending a caption, and outputs the partitioned candidate data 31 to the event selection unit 23.

Figure 4:
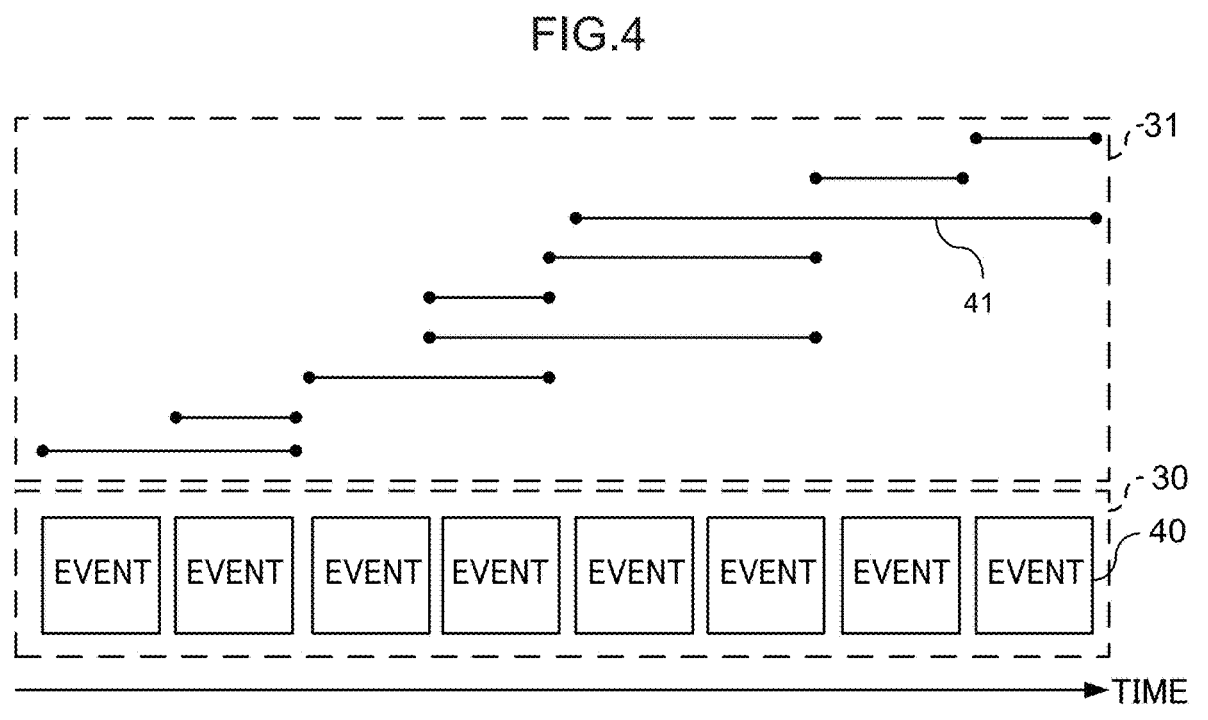

As in the example illustrated in FIG. 4, the partitioning unit 22 partitions the video image data 30 into event video images 41 of respective lengths so as to include extracted events 40, as candidate data 31. In other words, a single event 40 contained in the video image data 30 may be included in plural event video images 41 from out of the partitioned candidate data 31.

Note that as illustrated in FIG. 3, the partitioning unit includes a partitioning model 22A on which machine learning is performed on the partitioning of the video image data 30 into the respective event video images 41 so as to include the events 40. The partitioning model 22A is an MIL-NCE model trained with a data set Howto 100 M ("End-to-end learning of visual representations from un-curated instructional videos" by Antoine Miech, Jean-Baptiste Alayrac, Lucas Smaira, Ivan Laptev, Josef Sivic, and Andrew Zisserman in Proceedings of the IEEE Conference on Computer Vision and Pattern Recognition (CVPR), 2020).

The event selection unit 23 uses a selection model 23A to select event video images 41 from the candidate data 31 input by the partitioning unit 22 such that a range of the events 40 is neither too narrow nor too broad.

The selection model 23A is an autoregressive trained model (transformer) that has been trained to select the event video images 41 from the candidate data 31 such that the events 40 do not overlap. The selection model 23A outputs the selected event video image 41 as a first memory vector to the storage unit 26, described later, for storage therein. The selection model 23A uses the candidate data 31 and the first memory vector to select an event video image 41 indicating a continuation of the event video images 41 selected in the past.

Specifically, the selection model 23A illustrated in FIG. 3 includes an encoder 23B and a decoder 23C. The encoder 23B adds positional encoding and information related to each of the events 40 (for example a start time and an end time of each event) to the input candidate data 31, and extracts features. The encoder 23B inputs feature values of the extracted features to the decoder 23C.

The decoder 23C employs the input feature values and the first memory vector to extract a feature value related to each of the respective event video images 41. The decoder 23C uses the feature value related to each of the respective extracted event video images 41 to select an event video image 41 indicating a continuation of the event video images 41 selected in the past, and outputs the selected event video image (hereafter referred to as "selected data") 32 to the generation unit 24. The decoder 23C outputs the selected data 32 to the storage unit 26 and stores them therein as the first memory vector.

When selecting the event video images 41, the selection model 23A employs the feature value representing each of the event video images 41 and the first memory vector in a differentiable Gumbel-Softmax function, and derives a probability for each of the event video images 41. The selection model 23A outputs the event video image 41 having the highest probability as the selected data 32. Note that the probability of each of the event video images 41 is expressed by the following numerical expressions.

$$V_t = \max\left(V_t^1, \cdots, V_t^l, \cdots, V_t^L\right) \qquad (1)$$

$$p\left(n \mid V_t^l, X\right) = \frac{\exp\left((h_n^t)^T V_t\right)}{\sum_i \exp\left((h_i^t)^T V_t\right)} \qquad (2)$$

Wherein, V is a feature value of the selected data 32 indicated by the first memory vector, t is a number of the event for selection currently, 1 is a number of a candidate for an event video image, and L is a final number of event video image candidates. Moreover, p is the probability that each event video image 41 is selected, n is a number to identify event video images 41, X is the candidate data 31, and T is the final number of selected events. Moreover, h is a feature value the decoder 23C has extracted from the event video image 41, and i is a number to identify extracted feature values. Moreover, max is a function that returns a max value from out of the input values.

Namely, above Equation (1) represents selection of the event video image 41 indicating the maximum value of the stored first memory vector. Moreover, above Equation (2) is a Gumbel-Softmax function. The above Equation (2) employs the first memory vector and each of the event video images 41 to express the probability of each of the event video images 41 being selected. Due to representing the probability as a differentiable Gumbel-Softmax function, the selection model 23A is trainable with the processing of the event selection unit 23 and the generation unit 24 treated as a single cycle of processing without a break in the chain rule of differentiation.

As in the above Equation (2), the selection model 23A selects the event video image 41 having the maximum probability as the selected data 32, and outputs the selected data 32 to the generation unit 24.

The generation unit 24 uses an appending model 24A to append a caption to the selected data 32, and generates a caption-appended event video image. The generation unit 24 inputs the selected data 32, and a word appended to the selected data 32, to the appending model 24A.

The appending model 24A is an autoregressive trained model (transformer) trained to append captions to events contained in the selected data 32. The appending model 24A stores the word appended as a caption in the storage unit 26, described later, as a second memory vector. The appending model 24A uses the input selected data 32 and the second memory vector to select a word as a continuation of the appended words, and appends the selected word to the selected data 32 as a caption.

Specifically, the appending model 24A illustrated in FIG. 4 includes an encoder 24B and a decoder 24C. The encoder 24B acquires a variance expression corresponding to the selected data 32, adds the selected data 32 and a position encoding to this variance expression, and extracts a feature. The encoder 24B inputs a feature value of the extracted feature to the decoder 24C.

The decoder 24C uses the input feature value and the second memory vector to extract an event, and selects and appends a word indicating a continuation of words appended in the past to events. The appending model 24A appends words until the decoder 24C appends the final character, and outputs the appended words as a caption 33. The decoder 24C outputs the output caption 33 to the storage unit 26 as the second memory vector and stores it therein.

The output unit 25 concatenates the selected data 32 appended with the caption 33, and generates and outputs caption-appended video image data 34.

The storage unit 26 stores the above described first memory vector and second memory vector. Note that the storage unit 26 may also store training data to train the partitioning model 22A, the selection model 23A, and the appending model 24A, and may also store a variance expression of words that may be used by the appending model 24A.

The update unit 27 uses the first memory vector and the second memory vector to respectively update the first memory vector and the second memory vector. The update unit 27 updates the first memory vector and the second memory vector using the following numerical expressions.

$$\hat{V}_t = f_1(V_t) \odot \sigma(g_2(g_1(S_t))) \qquad (3)$$

$$\hat{S}_t = g_1(S_t) \odot \sigma(f_2(f_1(V_t))) \qquad (4)$$

Note that Vt hat (symbol ^ appended above Vt) is an updated first memory vector, St is the second memory vector, and St hat (symbol ^ appended above St) is an updated second memory vector. Moreover, f1 and f2 are functions that perform linear transformations in the selection model 23A, g1 and g2 are functions that perform linear transformations in the appending model 24A, and σ is a sigmoid function.

The above Equation (3) is the product taken of each corresponding component using a Hadamard product of the result of a linear transformation of Vt and a result of twice executing a linear transformation of St corresponding to Vt. The Equation (4) is similarly the product taken of each component using a Hadamard product of the result of a linear transformation of St and a result of twice executing a linear transformation of Vt corresponding to St.

Vt hat is the first memory vector updated and stored as a new feature for use when selecting the next event video image. St hat is the second memory vector updated and stored as a new feature for use when selecting the next word for the selected data 32.

The training unit 28 executes training on the partitioning model 22A, the selection model 23A, and the appending model 24A. The training unit 28 uses back propagation to respectively train the partitioning model 22A, the selection model 23A, and the appending model 24A so as to minimize a loss function. The training unit 28 uses the loss function expressed by the following numerical expression to train the selection model 23A and the appending model 24A.

$$L_e = -\sum_{(X,C)} \log p\left(C \mid X, V_1^l, \cdots, V_T^l\right) \tag{5}$$

$$L_S = -\sum_{(X,C,Y)} \sum_t \log p\left(y_t \mid h_{\hat{C}_t}, S_{<t}^l\right) \tag{6}$$

Wherein, Le is a loss function for the selection model 23A, C is a set of identifiers to identify the selected event 40, Ls is a loss function for the appending model 24A, and Y is a set of captions appended to the events 40.

The training unit 28 links the selection model 23A and the appending model 24A together for training so as to minimize a sum of the above Equation (5) and Equation (6). By computing the sum of the above Equation (5) and Equation (6), the training result of the appending model 24A is propagated to the selection model 23A, and training of the selection model 23A is executed.

Note that in the present exemplary embodiment a mode has been described in which the selection model 23A and the appending model 24A are linked together for training. However, there is no limitation thereto. The partitioning model 22A may also be linked together for training. For example, the training unit 28 may derive a loss function for the partitioning model 22A, and execute training using a sum of this loss function and the above Equation (5) and Equation (6).

Moreover, the partitioning model 22A, the selection model 23A, and the appending model 24A may each be trained individually.

Moreover, the training unit 28 may alternate between a method to link each of the models together for training, and a method to train each of the models individually. Adopting such an approach enables each of the models to be trained using, as taught data, many patterns of taught data including training data that is influenced by following connected models, and training data not dependent on following connected models.

Figure 5:
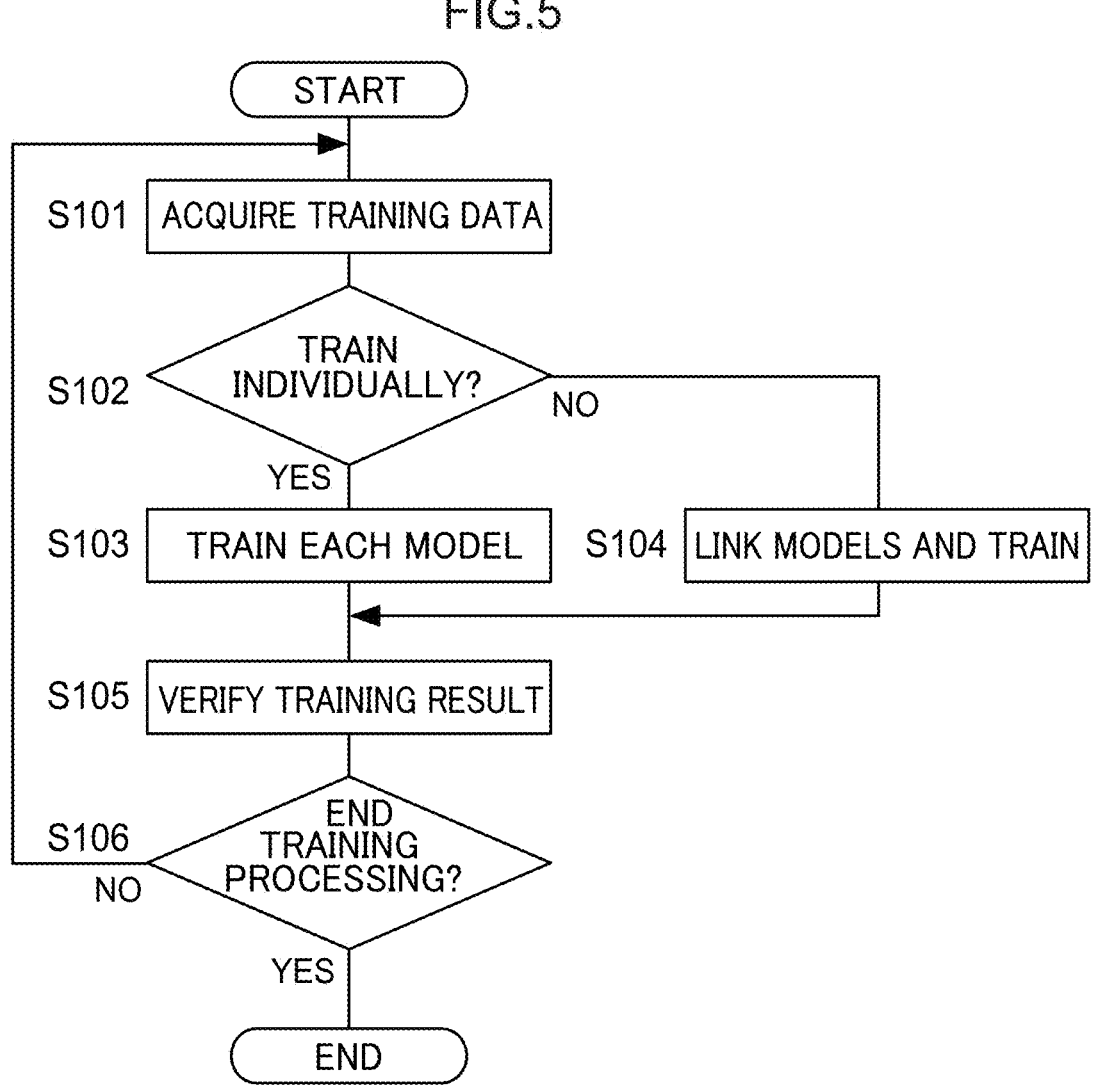
FIG. 5 is flowchart illustrating an example of training processing according to the present exemplary embodiment.
Figure 6:
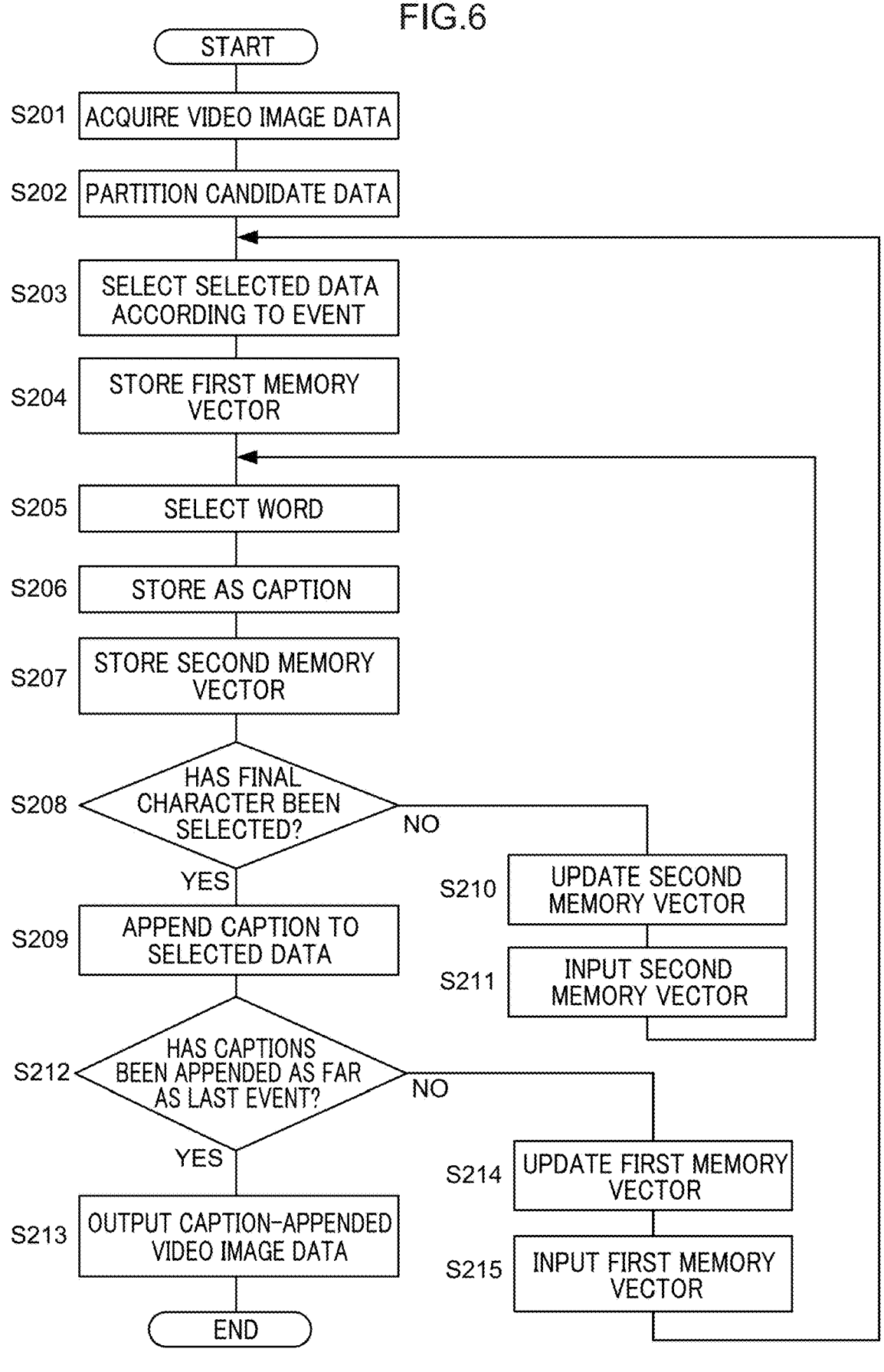
FIG. 6 is a flowchart illustrating an example of generation processing according to the present exemplary embodiment.

Next, description follows regarding operation of the information processing device 10 according to the present exemplary embodiment, with reference to FIG. 5 and FIG. 6. FIG.

5 is a flowchart illustrating an example of training processing related to the present exemplary embodiment. The training processing illustrated in FIG. 5 is executed by the CPU 11 reading and executing an information processing program from the ROM 12 or the storage 14. The training processing illustrated in FIG. 5 is executed, for example, when an instruction to execute training processing has been input.

At step S101, the CPU 11 acquires training data to train each of the models.

At step S102, the CPU 11 performs determination as to whether or not to train each of the models of the partitioning model 22A, the selection model 23A, and the appending model 24A individually. The CPU 11 transitions to step S103 in cases in which each of the models is to be trained individually (step S102: YES). However, the CPU 11 transitions to step S104 in cases in which each of the models is not to be trained individually (the models are to be linked together for training) (step S102: NO).

At step S103, from out of the acquired training data, the CPU 11 uses training data corresponding to each of the models to execute machine learning so as to respectively minimize each of the loss functions corresponding to each of the models.

At step S104, the CPU 11 uses the acquired training data, and links the models together and executes machine learning thereon. In this case the CPU 11 executes machine learning so as to minimize a sum of the loss functions corresponding to each of the models.

At step S105, the CPU 11 verifies training results for each of the models. For example, the CPU 11 performs a verification using verification data configured by captions appended as correct answer data to the video image data 30.

At step S106, the CPU 11 determines whether or not to end the training processing. The CPU 11 ends the training processing when training processing is to be ended (step S106: YES). On the other hand, the CPU 11 transitions to step S101 when the training processing is not to be ended (step S106: NO), and acquires new training data.

Next, description follows regarding generation processing to generate caption-appended video image data 34, with reference to FIG. 6. FIG. 6 is a flowchart illustrating an example of generation processing according to the present exemplary embodiment. The generation processing illustrated in FIG. 6 is executed by the CPU 11 reading the information processing program from the ROM 12 or the storage 14, and executing the generation processing. The generation processing illustrated in FIG. 6 is, for example, executed in cases in which the video image data 30 and an instruction to execute generation processing have been input.

At step S201 the CPU 11 acquires the input video image data 30.

At step S202 the CPU 11 partitions the acquired video image data 30 into the candidate data 31 including the events 40.

At step S203, the CPU 11 uses the candidate data 31 and the first memory vector to select the selected data 32.

At step S204, the CPU 11 stores the selected data 32 as the first memory vector.

At step S205, the CPU 11 uses the selected data 32 and the second memory vector to select a word.

At step S206, the CPU 11 stores the selected word as a caption 33 for appending to the selected data 32.

At step S207, the CPU 11 stores the selected word as the second memory vector.

At step S208, the CPU 11 performs determination as to whether or not the final character has been selected as the word. The CPU 11 transitions to step S209 when the final character has been selected (step S208: YES). On the other hand, the CPU 11 transitions to step S210 when the final character has not been selected (step S208: NO).

At step S209, the CPU 11 appends the stored caption 33 to the selected data 32 and stores.

At step S210, the CPU 11 uses the first memory vector to update the second memory vector.

At step S211, the CPU 11 inputs the updated second memory vector to the appending model 24A. The CPU 11 then transitions to step S205, and selects a word indicating a continuation of the selected words.

At step S212, the CPU 11 performs determination as to whether or not the captions 33 have been appended to the events 40 included in the video image data 30 as far as the last event 40. The CPU 11 transitions to step S213 in cases in which the captions 33 have been appended as far as the last event 40 (step S212: YES). On the other hand, the CPU 11 transitions to step S214 in cases in which the captions 33 have not been appended as far as the last event 40 (there is still an event 40 not appended with a caption 33 present) (step S212: NO).

At step S213, the CPU 11 concatenates the selected data 32 appended with the captions 33 and outputs this as caption-appended video image data 34.

At step S214, the CPU 11 uses the second memory vector to update the first memory vector.

At step S215, the CPU 11 inputs the updated first memory vector to the selection model 23A. The CPU 11 then transitions to step S203, and selects selected data 32 indicating a continuation of the selected data 32 that had been selected.

As described above, the present exemplary embodiment appends captions with high accuracy when appending captions to events using a model for extracting events and a model for adding captions to the extracted events.

The above exemplary embodiments are merely intended to schematically describe configuration examples of the present disclosure. The present disclosure is not limited to the specific embodiments described above, and various modifications may be implemented within a technical range of the present disclosure.

Note that control processing executed by the CPU reading software (a program) in each of the above exemplary embodiments may be executed by various processors other than a CPU. Such processors include programmable logic devices (PLD) that allow circuit configuration to be modified post-manufacture, such as field-programmable gate arrays (FPGA), and dedicated electronic circuits, these being processors including a circuit configuration custom-designed to execute specific processing, such as an application specific integrated circuit (ASIC). Moreover, the training processing and the generation processing may be executed by any one of these various types of processor, or may be executed by a combination of two or more of the same type or different types of processor (such as plural FPGAs, or a combination of a CPU and an FPGA). The hardware structure of these various types of processors is more specifically an electronic circuit combining circuit elements such as semiconductor elements. This processing may, moreover, be executed using a graphics processing unit (GPU) together with a CPU.

Moreover, although in each of the above exemplary embodiments an embodiment has been described in which the information processing program is pre-stored (installed)

on the storage 14 or the ROM 12, there is no limitation thereto. The program may be supplied in a format recorded on a non-transitory recording medium such as a compact disk read only memory (CD-ROM), digital versatile disk read only memory (DVD-ROM), universal serial bus (USB) memory, or the like. This program may also be in a format for downloading from an external device over a network.

The entire content of the disclosure of Japanese Patent Application No. 2022-032177 is incorporated by reference in the present specification.

All publications, patent applications and technical standards mentioned in the present specification are incorporated by reference in the present specification to the same extent as if each individual publication, patent application, or technical standard was specifically and individually indicated to be incorporated by reference.

The invention claimed is:

1. An information processing device, comprising:
one or more processors; and memory storing one or more programs, the one or more programs including instructions that, when executed by the one or more processors, cause the one or more processors to:
acquire a video image;
partition the acquired video image into a plurality of event video images as candidates for appending a caption by partitioning according to events;
select an event video image from the partitioned event video image candidates by using a selection model such that a range of an event is neither too broad nor too narrow, wherein the selection model selects the event video image using a differentiable function;
generate a video image set with captions by employing an appending model for appending a caption to an event represented by the input event video image to append a caption to the selected event video image;
store a feature of an event video image selected in the past from the candidates in a first memory vector, and when selecting the event video image, employ the first memory vector to select an event video image indicating a continuation of an event video image selected in the past;
store a feature value of the caption appended to the event video image in a second memory vector;
employ the second memory vector to select a word indicating a continuation of an appended caption;
add the selected word to a caption appended in the past and append this to the event video image; and
update the first memory vector using the second memory vector, and use the updated first memory vector to select a next event video image from the candidates.

2. The information processing device of claim 1, wherein the differentiable function includes a Gumbel-Softmax function.

3. The information processing device of claim 2, further comprising:
training by propagating a training result leaned by the appending model to the selection model, or training each of the selection model and the appending model individually.

4. The information processing device of claim 2, the one or more processors are further configured to:
update the second memory vector, using the first memory vector, and
select a next word for the selected event video image using the updated second memory vector.

5. The information processing device of claim 2, the one or more processors are further configured to:

training by propagating a training result learned by the appending model to the selection model, or training each of the selection model and the appending model individually.

6. The information processing device of claim 5, wherein:

partitioning the acquired video image is performed by a partitioning model that has been trained to partition the event video image from the video image; and training by propagating the training result learned by the selection model to the partitioning model.

7. The information processing device of claim 1, wherein the one or more processors are further configured to:

update the second memory vector, using the first memory vector, and select a next word for the selected event video image using the updated second memory vector.

8. The information processing device of claim 7, further comprising:

training by propagating a training result learned by the appending model to the selection model, or training each of the selection model and the appending model individually.

9. The information processing device of claim 1, wherein the one or more processors are further configured to:

train by propagating a training result learned by the appending model to the selection model, or train each of the selection model and the appending model individually.

10. The information processing device of claim 9, wherein:

partitioning the acquired video image is performed by a partitioning model that has been trained to partition the event video image from the video image; and training by propagating the training result learned by the selection model to the partitioning model.

11. An information processing method comprising:

at a computer system that includes one or more processors and memory:

acquiring a video image;

partitioning the acquired video image into a plurality of event video images as candidates for appending a caption by partitioning according to events;

selecting an event video image from the partitioned event video image candidates by using a selection model such that a range of an event is neither too broad nor too narrow, wherein the selection model selects the event video image using a differentiable function;

generating a video image set with captions by employing an appending model for appending a caption to an event represented by the input event video image to append a caption to the selected event video image;

storing a feature of an event video image selected in the past from the candidates in a first memory vector, and when selecting the event video image, employing the first memory vector to select an event video image indicating a continuation of an event video image selected in the past; storing a feature value of the caption appended to the event video image in a second memory vector;

employing the second memory vector to select a word indicating a continuation of an appended caption;

adding the selected word to a caption appended in the past and appending this to the event video image; and updating the first memory vector stored in the storage unit, using the second memory vector, to select a next event video image from the candidates.

12. The information processing method of claim 11, wherein the differentiable function includes a Gumbel-Softmax function.

13. The information processing method of claim 11, further comprising:

updating the second memory vector stored in the storage unit, using the first memory vector, and selecting a next word for the selected event video image using the updated second memory vector.

14. The information processing method claim 11, further comprising:

training by propagating a training result learned by the appending model to the selection model, or individually training each of the selection model and the appending model.

15. The information processing method of claim 14, wherein:

partitioning the acquired video image is performed by a partitioning model that has been trained to partition the event video image from the video image; and training by propagating the training result learned by the selection model to the partitioning model.

16. A non-transitory computer-readable storage medium storing an information processing program that causes processing to be executed by a computer, the processing comprising:

acquiring a video image;

partitioning the acquired video image into a plurality of event video images as candidates for appending a caption by partitioning according to events;

selecting an event video image from the partitioned event video image candidates by using a selection model such that a range of an event is neither too broad nor too narrow, wherein the selection model selects the event video image using a differentiable function;

generating a video image set with captions by employing an appending model for appending a caption to an event represented by the input event video image to append a caption to the selected event video image;

storing a feature of an event video image selected in the past from the candidates in a first memory vector, and when selecting the event video image, employing the first memory vector to select an event video image indicating a continuation of an event video image selected in the past;

storing a feature value of the caption appended to the event video image in a second memory vector;

employing the second memory vector to select a word indicating a continuation of an appended caption;

adding the selected word to a caption appended in the past and appending this to the event video image; and updating the first memory vector stored in the storage unit, using the second memory vector, to select a next event video image from the candidates.

17. The non-transitory computer-readable storage medium of claim 16, wherein the differentiable function includes a Gumbel-Softmax function.

18. The non-transitory computer-readable storage medium of claim 16, further comprising:

updating the second memory vector stored in the storage unit, using the first memory vector, and selecting a next word for the selected event video image using the updated second memory vector.

19. The non-transitory computer-readable storage medium of claim 16, further comprising:

training by propagating a training result learned by the appending model to the selection model, or individually training each of the selection model and the appending model.

20. The non-transitory computer-readable storage medium of claim 19, wherein:

partitioning the acquired video image is performed by a partitioning model that has been trained to partition the event video image from the video image; and training by propagating the training result learnt by the selection model to the partitioning model.

\* \* \* \* \*